(12) United States Patent
Beals

(10) Patent No.: US 7,190,686 B1
(45) Date of Patent: Mar. 13, 2007

(54) SELF CONFIGURING HIGH THROUGHPUT MEDIUM ACCESS CONTROL FOR WIRELESS NETWORKS

(75) Inventor: Andrew Beals, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 615 days.

(21) Appl. No.: 09/742,888

(22) Filed: Dec. 20, 2000

(51) Int. Cl.
*H04B 7/212* (2006.01)
*H04J 3/00* (2006.01)

(52) U.S. Cl. ................ 370/337; 370/347; 370/442

(58) Field of Classification Search ........... 370/310, 370/319, 321–322, 326, 328–329, 331, 336–337, 370/345–350, 395.4, 428, 431, 442–443, 370/458, 461–463, 498; 455/421, 432.1, 455/433–434, 435.1, 449, 456.1, 500, 507, 455/515–517
See application file for complete search history.

(56) References Cited

U.S. PATENT DOCUMENTS

| | | | | |
|---|---|---|---|---|
| 5,487,065 A * | 1/1996 | Acampora et al. | ........... | 370/331 |
| 5,504,746 A * | 4/1996 | Meier | ........................... | 370/256 |
| 5,528,583 A * | 6/1996 | Acampora et al. | ........... | 370/256 |
| 5,633,873 A * | 5/1997 | Kay et al. | ..................... | 370/336 |
| 5,708,655 A * | 1/1998 | Toth et al. | .................... | 370/313 |
| 5,859,959 A | 1/1999 | Kimball et al. | ......... | 395/182.02 |
| 5,901,362 A * | 5/1999 | Cheung et al. | .............. | 455/525 |
| 6,377,805 B1 * | 4/2002 | Anvekar et al. | ............. | 455/436 |
| 6,597,683 B1 * | 7/2003 | Gehring et al. | .............. | 370/348 |
| 6,628,953 B1 * | 9/2003 | Dillon et al. | ............. | 455/452.1 |
| 6,691,173 B2 * | 2/2004 | Morris et al. | ................ | 709/249 |
| 6,728,514 B2 * | 4/2004 | Bandeira et al. | ............ | 455/13.1 |
| 6,785,510 B2 * | 8/2004 | Larsen | ....................... | 455/11.1 |
| 6,831,902 B1 * | 12/2004 | Dougherty et al. | .......... | 370/328 |
| 2002/0023174 A1 * | 2/2002 | Garrett et al. | .............. | 709/245 |
| 2002/0072329 A1 * | 6/2002 | Bandeira et al. | ............... | 455/7 |
| 2002/0159434 A1 * | 10/2002 | Gosior et al. | ................ | 370/350 |
| 2002/0173321 A1 * | 11/2002 | Marsden et al. | ............ | 455/500 |
| 2003/0096577 A1 * | 5/2003 | Heinonen et al. | .............. | 455/41 |
| 2004/0028071 A1 * | 2/2004 | Gehring et al. | .............. | 370/442 |

OTHER PUBLICATIONS

Abramson, Norman, "The Aloha System—Another Alternative for Computer Communications", AFIPS Conference Proceedings, vol. 37, Houston, Texas.

Acampora, Anthony S., "An Introduction to Broadband Networks", Columbia University, New York, New York.

Karol, Mark J., "An Efficient Demand-Assignment Multiple Access Protocol for Wireless Packet (ATM) Networks", ACM/Baltzer Wireless Networks, vol. 1, No. 3, pp. 267-279, 1995.

* cited by examiner

*Primary Examiner*—Seema S. Rao
*Assistant Examiner*—Gregory Sefcheck
(74) *Attorney, Agent, or Firm*—Cindy Kaplan

(57) ABSTRACT

A network architecture that coordinates shared access to a wireless transmission medium while avoiding collisions between simultaneous transmissions even where network nodes cannot hear one another. There is also the capability of readily reconfiguring a wireless network to accommodate new nodes. In one embodiment, there is a hierarchy of master nodes that coordinate wireless transmissions by the other nodes. Since the need for retransmission is minimized, throughput is improved.

23 Claims, 7 Drawing Sheets

SELF CONFIGURING HIGH THROUGHPUT MEDIUM ACCESS CONTROL FOR WIRELESS NETWORKS

BACKGROUND OF THE INVENTION

The present invention is directed toward wireless networks and more particularly to systems and methods for sharing access to a common wireless transmission medium.

In a wireless network with multiple data communication devices, an important problem to solve is how to schedule access to a shared wireless transmission medium. Typically, spectrum is limited. Except for spread spectrum systems which present other management challenges such as power control, only one device can be heard at a time on a given frequency. One technique for organizing access to the common wireless transmission medium is known as CSMA (Carrier Sense Multiple Access) with a related technique being known as CSMA-CD (Carrier Sense Multiple Access—Collision Detection). In these techniques, a device having data to communicate listens for other devices. If no other transmissions are heard, the device having data to communicate begins its own transmission. In the CSMA-CD variant, the device is capable of sensing that another device has begun transmitting simultaneously. This is known as a collision and both devices stop transmitting and then reattempt transmission after pseudo-randomly chosen delay times.

Unfortunately, a limitation of this technique is that not every data communication device in the network is within communication range of all the others. Consider a situation where a device B can communicate directly with both A and C but A and C are separated by too large a distance to detect when the other is transmitting, and are therefore unable to communicate directly. To illustrate the problem that can arise, suppose A is transmitting to B. Since C cannot detect A's transmissions, it will mistakenly assume that the medium is not being used. Then suppose that C, mistakenly believing that the bus is idle, attempts to transmit a message to B. As a result, a data collision occurs at B and the messages transmitted by A and C are both corrupted or one of the messages is lost. A situation such as this is commonly referred to as the "hidden transmitter problem." When the wireless communication network is implementing higher level protocols such as IP and TCP, a result of the hidden transmitter problem is that the higher level protocols must frequently retransmit data and the physical layer is therefore used very inefficiently.

An alternative technique that solves the hidden transmitter problem involves providing a specialized data communication device known as a central access point. The central access point is able to communicate with all of the other nodes of the wireless communication network. The central access point distributes a transmission schedule to the other nodes and this transmission schedule is followed, theoretically eliminating the possibilities of collisions. The network nodes other than the central access point are then referred to as "subscriber units."

In this architecture, however, all of the subscriber unit nodes must be within range of the central access point. Even if communication is theoretically possible because a remote node can reach one of the subscriber units of the network, the remote node cannot be accommodated if it is out of range of the central access point.

Another solution is a split frequency system. All of the nodes transmit on frequency F1 and receive on frequency F2. A central rebroadcast node rebroadcasts everything heard on F1 on F2. This provides a mechanism for a CSMA or CSMA-CD system to ensure that all nodes can hear one another. Again there must be a central device capable of direct communication with all other nodes. What is needed is a wireless medium access control architecture that does not require frequent retransmissions due to collisions, does not require that a central node be within range of all other nodes, and that can adapt easily to addition of new network nodes.

SUMMARY OF THE INVENTION

A network architecture that coordinates shared access to a wireless transmission medium while avoiding collisions between simultaneous transmissions even where network nodes cannot hear one another is provided by virtue of one embodiment of the present invention. There is also the capability of readily reconfiguring a wireless network to accommodate new nodes. In one embodiment, there is a hierarchy of master nodes that coordinate wireless transmissions by the other nodes. Since the need for retransmission is minimized, throughput is improved.

According to one aspect of the present invention, a method is provided for coordinating access to a shared transmission medium in a wireless communication network. The method includes: upon admission of a new node, recording on a master node a contact path from the master node to the new node, at the master node, developing a schedule of wireless transmission for nodes of the wireless communication network, where the schedule precludes collisions between simultaneous transmission by any pair of nodes controlled by the master node including pairs of nodes that do not hear each others transmissions. The method includes distributing the schedule from the master node to nodes controlled by the master node.

A further understanding of the nature and advantages of the inventions herein may be realized by reference to the remaining portions of the specification and the attached drawings.

DESCRIPTION OF SPECIFIC EMBODIMENTS

Generally, the data communication techniques of the present invention may be implemented in software and/or hardware. For example, they can be implemented in an operating system kernel and separate user processes, in a library package bound into a network application, on a specially constructed machine, or on a network interface card.

Figure 1:
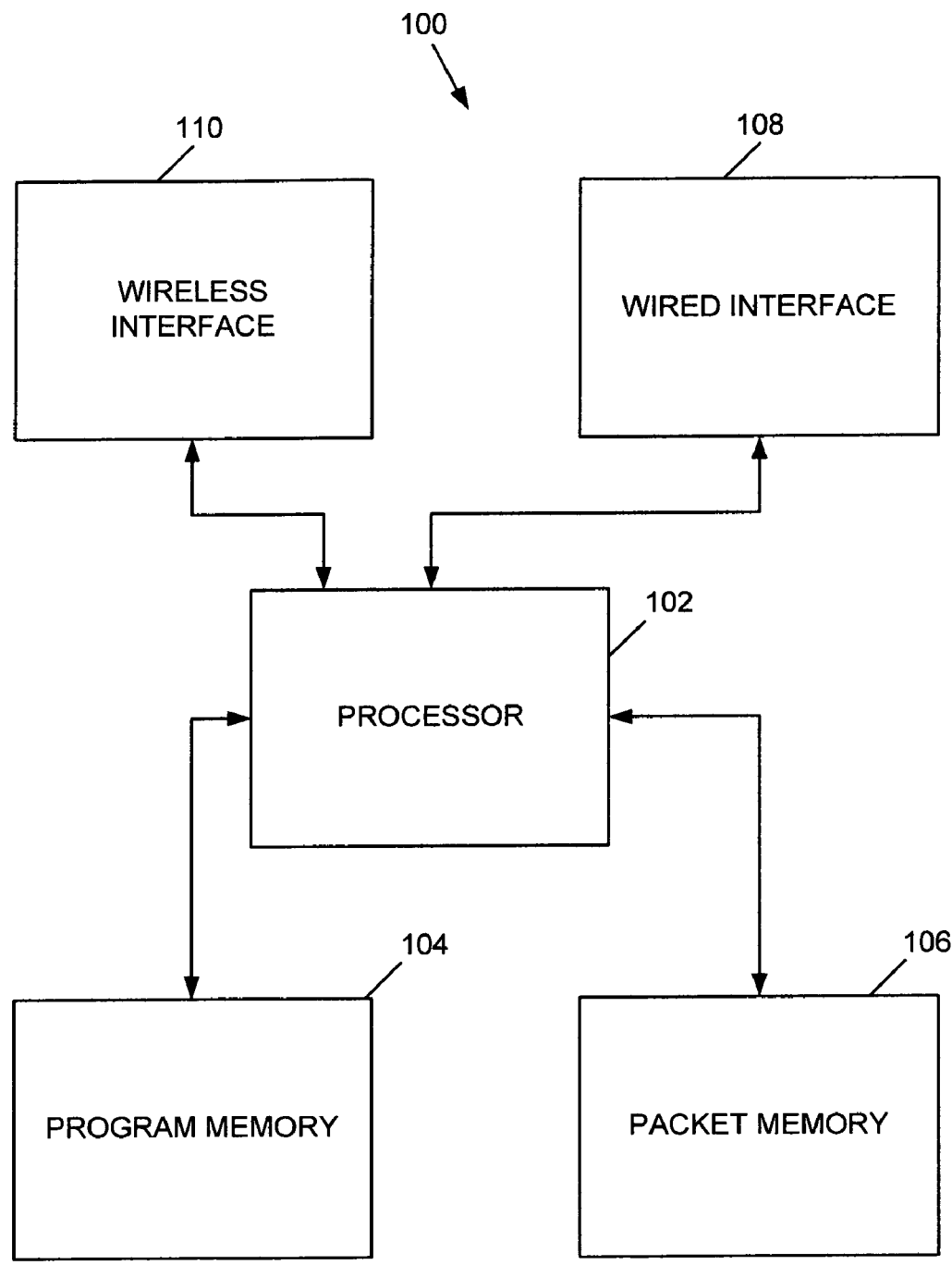
FIG. 1 depicts a hardware and/or software architecture usable to implement devices according to one embodiment of the present invention.

FIG. 1 depicts a network device usable to implement one embodiment of the present invention. The network device may be a general-purpose programmable machine selectively activated or reconfigured by a computer program stored in memory. A radio interface connects the network device to a wireless communication medium. The network device itself may be, e.g., a router, a switch, a network interface card for a computer, a PC card for a laptop computer, a cellular phone, a personal digital assistant (PDA) etc.

FIG. 1 depicts a general architecture 100 for such a network device. Network device 100 includes a processor 102. Processor 102 may be, e.g., a general microprocessor, a specialized network processor, or other computing device. In one embodiment, processor 102 executes software code that is stored in a program memory 104. Program memory 104 may be RAM and/or ROM. Program memory 104 may represent short-term storage for software that is also stored or distributed on long term storage media.

Either program memory 104 or the long term storage media are examples of computer readable media that include program instructions, state information, etc. for performing the functions and operations described herein. Examples of the machine readable media include, but are not limited to, magnetic media such as hard disks, floppy disks, and magnetic tape, optical media such as CD-ROM disks, magneto-optical media such as optical disks, and hardware devices that are specially configured to store and perform program instructions. The invention may also be embodied in a carrier wave carrying information over an appropriate medium such as airwaves, optical lines, electric lines. Examples of program instructions include both machine code such as produced by a compiler, and files containing higher level code that may be executed by the computer using an interpreter. Also, processor 102 may be a specialized device configured to perform the functions and operations described herein without the use of software.

A packet memory 106 provides intermediate storage of packets generated, relayed, and/or received by network device 100. Packet memory 106 may also be used to store data that is not in packet form.

Network device 100 may include a wired interface 108. Wired interface 108 may be an Ethernet interface, Frame Relay interface, cable interface, DSL interface, token ring interface, etc. Other options for interface 108 include fast Ethernet interfaces, gigabit Ethernet interfaces, ATM interfaces, HSSI interfaces, POS interfaces, FTTH interfaces and the like. Generally, these interfaces may include ports appropriate for communication with the appropriate media. In some cases, the wired interface 108 may include an independent processor and memory storing instructions for the processor.

In one embodiment, the present invention is directed towards a wireless communication network. Accordingly, data communication device is depicted as including a wireless interface 110. Wireless interface 110 includes a wireless transceiver and an antenna for coupling to a wireless transmission medium. Wireless interface 110 includes physical layer processing components to perform functions such as modulation, demodulation, error correction coding, error correction decoding, synchronization, channel estimation and correction, equalization, amplification, filtering, etc. Wireless interface 110 may also include MAC layer processing capabilities to implement medium access control functionality including the functionality described herein. Wireless interface 110 may include its own processor and/or memory to perform the operations described herein. The memory and any other medium storing code performed by a processor of wireless interface 110 is yet another example of a computer readable storage medium relevant to the present invention.

According to one embodiment to the present invention, access to a shared wireless transmission medium may be coordinated by a master node even when the master node is not able to communicate directly with all of the other nodes of the network. For example, the master node may be responsible for overall coordination of transmissions by nodes that are beyond transmission and reception range from the master node. In one embodiment, this is accomplished by providing a hierarchy of bus controllers or masters and submasters.

Figure 2:
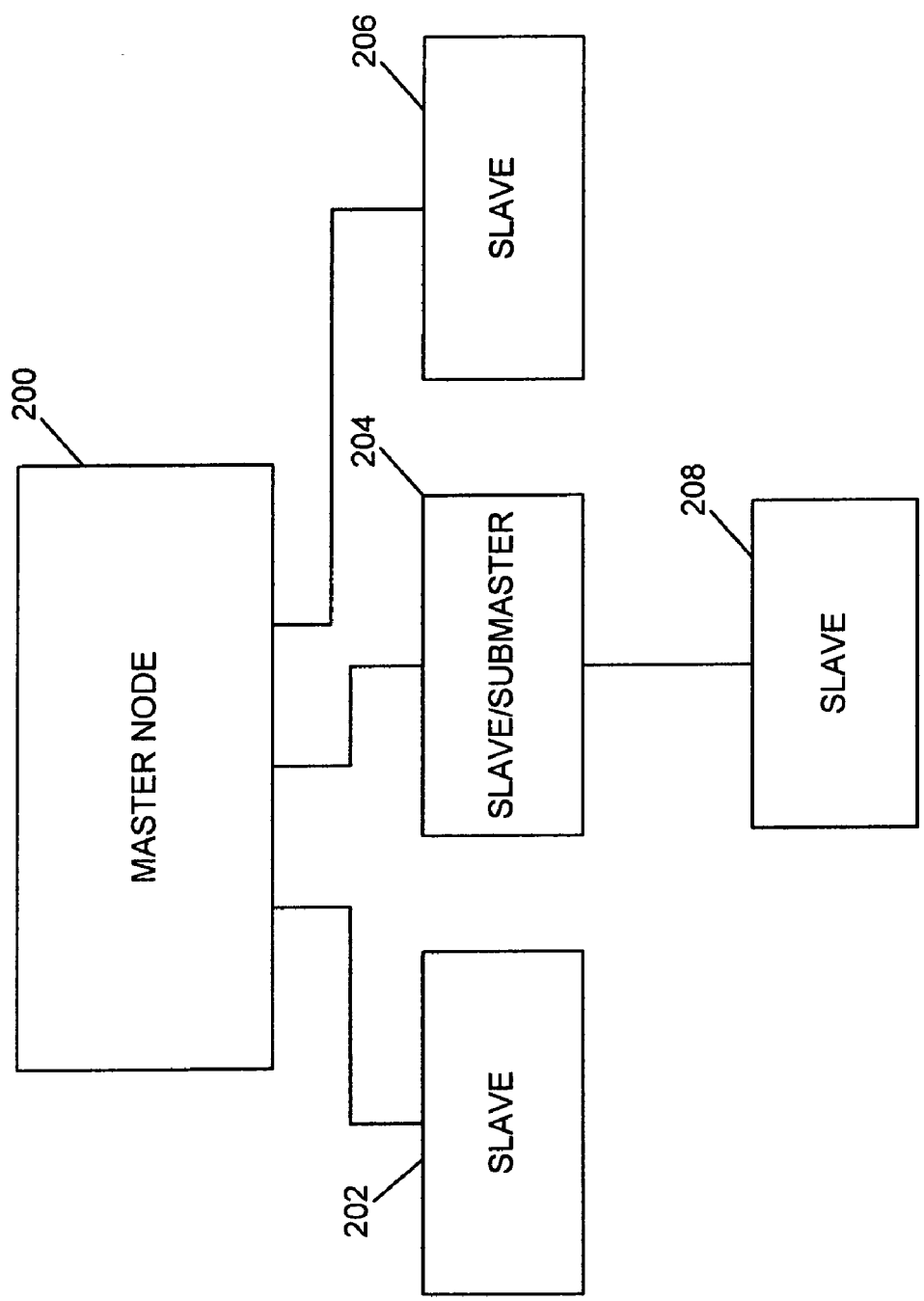
FIG. 2 depicts a transmission control hierarchy according to one embodiment of the present invention.

FIG. 2 illustrates a simplified example of a transmission control hierarchy according to one embodiment of the present invention. A master node 200 is responsible for overall MAC layer control of the network. The network includes four slaves under the control of the master: 202, 204, 206 and 208. Slaves 202, 204, and 206 are within range of master node 200. Slave 208, however, cannot be directly contacted by master node 200 but can be directly contacted by slave node 204 which acts as a submaster.

Access to the shared medium is coordinated by a TDMA (time division multiple access) protocol. Master node 200 develops a schedule that divides time for transmission among the various nodes. The schedule provides transmission time for the master node itself, as well as times allocated to each of slave nodes 202, 204, and 206. The time reserved for slave node 204 is not only for transmissions by slave node 204 but also for transmissions by slave node 208. The transmission schedule developed by master node 200 provides extra time for the slot for slave node 204 because that slot actually includes transmissions by two devices. Typically, slave node 204 will retransmit information sent by slave node 208 so that it can be received by master node 200. At any of the nodes, when a higher level protocol has data to transmit, it is buffered until the transmission slot allocated to that node is reached.

The simple example of FIG. 2 illustrates a control scheme with three levels of hierarchy but the present invention is applicable to any number of levels of hierarchy. For example, slave node 208 may be able to communicate directly with one or more nodes that cannot be directly contacted from either slave node 204 or master node 200. Thus, the transmission slot for slave node 208 (which itself exists within the allocation for slave 204) may also accommodate transmission by another node. In this way, slave node 208 can also act as a submaster.

The transmission schedule itself may take any form. Each slave node may be allowed to transmit one packet during its slot or some other fixed number of packets. Another alternative is for the time allocation to be based on demand In a demand-based scheme, each node is initially allocated a time slot for requesting access. Master node 200 makes its schedule based on the access requests and the amount of data that each node needs to transmit. Scheduling may also be delegated to submasters for the nodes that they control.

All of these schemes that are based on allowing a single node to transmit at a time may be understood in terms of a transmission token. The master node is the primary possessor of the token and decides which of the nodes it is in direct contact with gets the token at any time. During a time period that the master node has ceded control of the token to a submaster, the submaster is allowed to pass the token among slave nodes under its control.

It will be appreciated that this transmission control scheme makes collisions impossible or unlikely. Master node 302 has control of all the nodes beneath it in the network control hierarchy and only one node transmits at a time. No two nodes transmit simultaneously even if they cannot hear one another.

Figure 3:
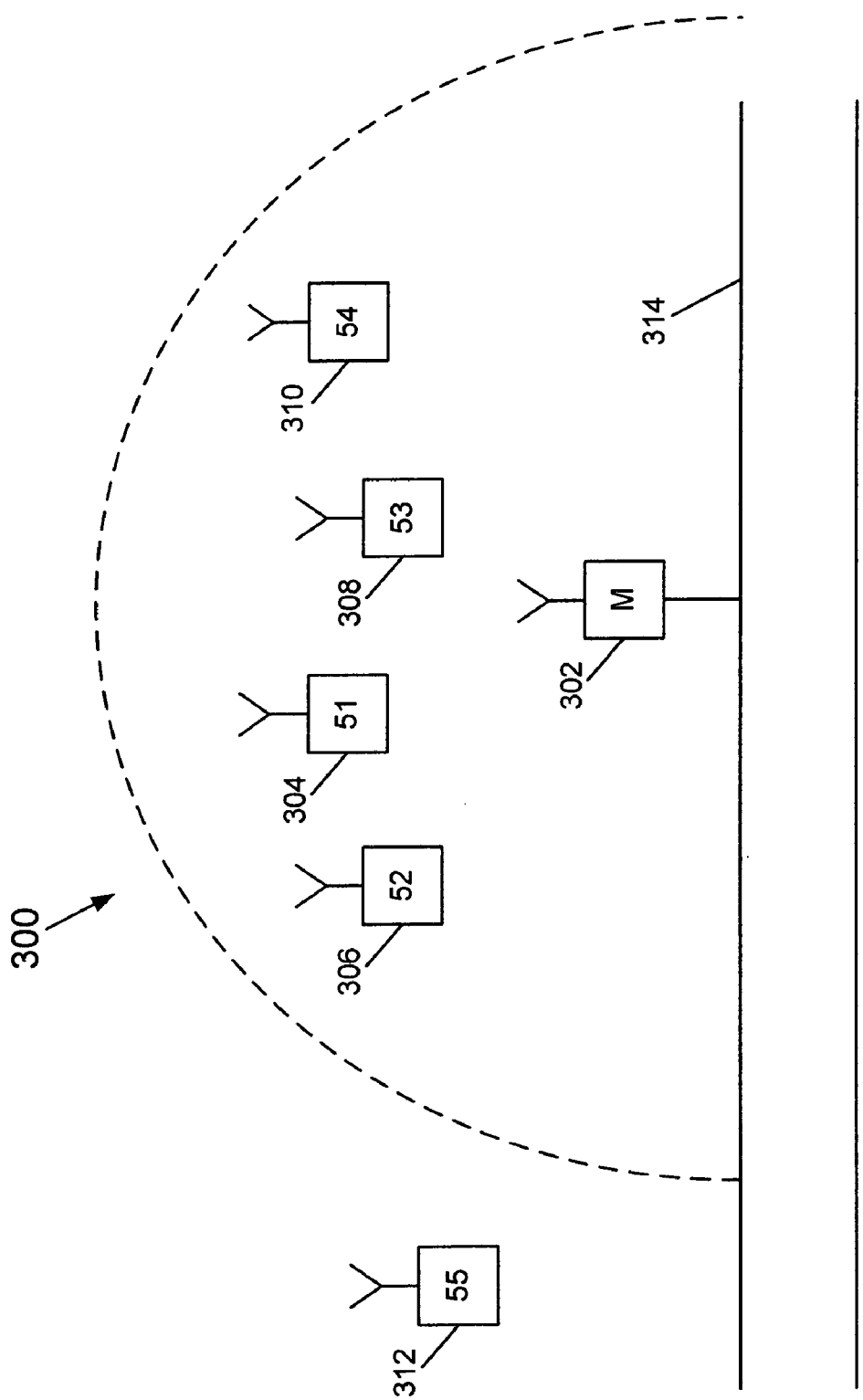
FIG. 3 depicts a representative network layout according to one embodiment of the present invention.

FIG. 3 spatially depicts another representative network 300. A master node 302 (M) interacts directly with slave nodes 304 (S1), 306 (S2), 308 (S3), and 310 (S4). There is also a slave node 312. Slave node 312 is out of range of master node 302 so the slave node 306 acts as a submaster for slave node 312. Master node 302 is directly connected to a wired network 314 such as a LAN. Master node 302 thus, in addition to acting as a MAC layer network controller, also acts a relay point from the wireless communication network to a wired communication network. It will be appreciated, however, that the master node that acts as the MAC layer controller need not be the same node that provides wired connectivity. Also, multiple nodes of the wireless network may provide alternative points of connectivity to a wired network.

Figure 4:
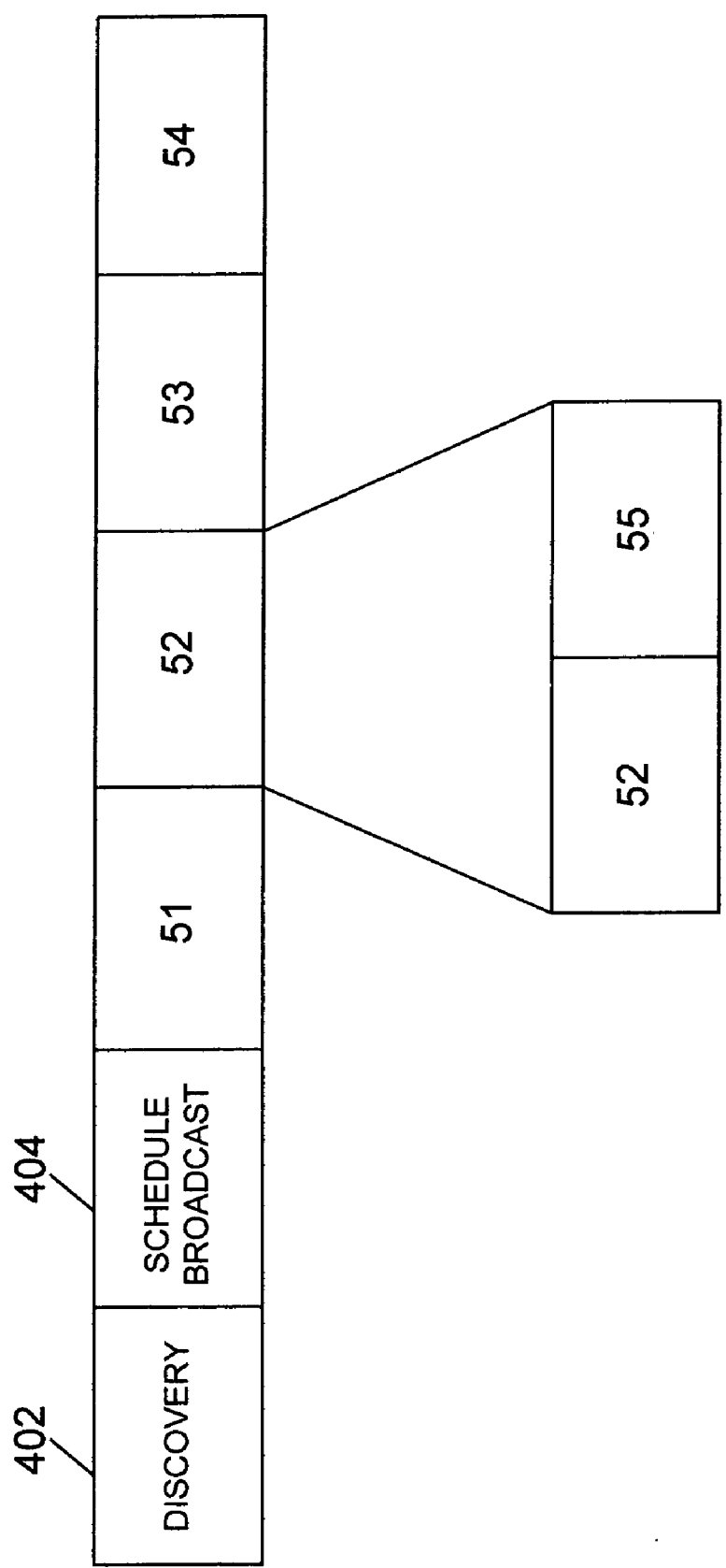
FIG. 4 depicts a transmission control schedule according to one embodiment of the present invention.

FIG. 4 depicts a transmission schedule for the operation of network 300 according to one embodiment of the present invention. The transmission schedule includes a discovery period 402. Discovery period 402 is provided for the purpose of configuring the network and taking newly active nodes into account. For example, a new wireless communication device may be activated, requiring reconfiguration of the network control hierarchy. Alternatively, a new node may be a mobile node that has traveled into the area and wishes to join network 300.

A schedule broadcast period 404 is provided so that master node 302 can distribute the transmission schedule to its slave nodes. Submasters then react and inform their own slaves of the transmission times allocated to them. The schedule prepared by master node 302 may specify transmission times for slaves of submasters. Alternatively, the submasters determine the transmission times for their own slaves. The schedule period may include time for submasters to propagate the schedule further down the network control hierarchy. Alternatively, the submasters may use their own transmission slots to forward the schedule.

The remaining time is divided up among the four slave nodes in direct contact with master node 302. The periods are depicted as being equal but they need not be. It is shown that the time allocated to the S2 node is actually used for transmission by both S2 and by S5. The suballocation of the S2 slot between S2 and S5 may be defined either by master node M or by S2 which acts as the submaster.

The discussion up until now as concentrated on link layer connectivity. In one embodiment, each node incorporates a routing client, e.g., OSPF, that is aware of the available links between nodes. In one embodiment where the master node is a bridge to the wired network, data to be communicated travels either up or down the hierarchy of FIG. 2. The routing client at the master node uses the network control hierarchy to know where to forward data addressed to the interior of the wireless network. The routing clients at submaster nodes are similarly aware of the hierarchies above and below them. For a slave that is at the bottom of the hierarchy the routing scheme is then simple. All data originating with the slave is forwarded to the master or submaster in immediate control of that slave.

Alternatively, the routing scheme is independent of the network control hierarchy. The routing protocol at each node is informed not only of the master and slaves in direct contact with the node but also other nodes to which direct links are available. The routing clients can then discover further network connectivity information according to well-known routing techniques. The flow of information through the network then does not necessarily follow the network control hierarchy and any node that is able to can act as a relay.

The registration of a new node to network 300 will now be described with reference to FIGS. 5–7. The registration process will be described with reference to the activities of individual nodes in a network: the master node, the new node, and in certain situations, a submaster node that can directly access the new node even if the master node cannot.

Figure 5:
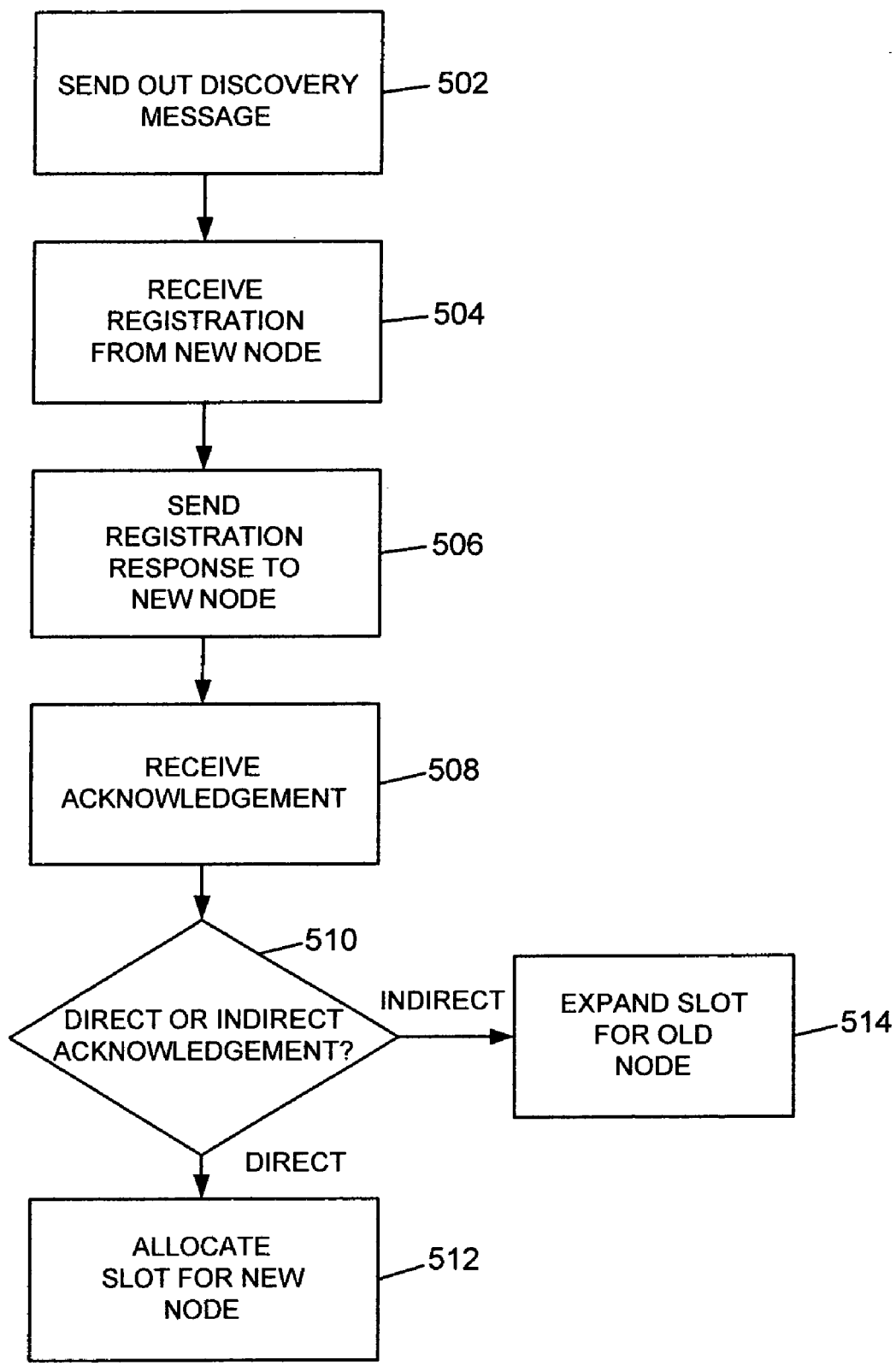
FIG. 5 is a flowchart describing steps of operating a master node according to one embodiment of the present invention.

FIG. 5 is a flowchart describing steps of operating the master node in the registration process. A step 502 occurs during the discovery period depicted in FIG. 4. Master node 302 sends out a discovery message to obtain a response from any nodes newly accessible to the network. In some implementations, time is reserved in the discovery period for individual slave nodes to echo the discovery message or send out their own discovery messages so that they can obtain information about new nodes that are not directly accessible by the master node.

At step 504, master node 302 receives a registration message from a new node. This registration message includes the MAC layer address of the new node. This registration message may be received either directly from the new node or via one of the slave nodes. At step 506, master node 302 sends a registration response to the new node. In one embodiment, this registration response includes an IP address assigned by a DHCP client at master node 302. The registration response is an invitation for new node to join network 300.

An acknowledgment is received from the new node at a step 508. Step 510 determines whether the acknowledgment was received directly from the new node or via a slave node able to contact the new node directly. If the acknowledgment is direct, master node 302 allocates a slot for the new node in a transmission schedule at step 512. If the acknowledgment is received indirectly, i.e., via a slave node, then master node 302 expands the transmission slot reserved for the slave node or nodes acting as the relay at step 514. This slot will then also be used for transmissions by the new node under control of the slave node which acts as a submaster.

In conjunction with allocating the transmission slot at either step 512 or step 514, the master node also records the contact path to the node. The contact path may be direct if the acknowledgement is received directly or via one or more slave nodes if the acknowledgement is received indirectly. The contact path corresponds to a route from the master node to the new node through the network control hierarchy of FIG. 2. This contact path is registered to the routing client at the master node. It will be appreciated that the steps of FIG. 5 may occur over two or more successive discovery periods.

Figure 6:
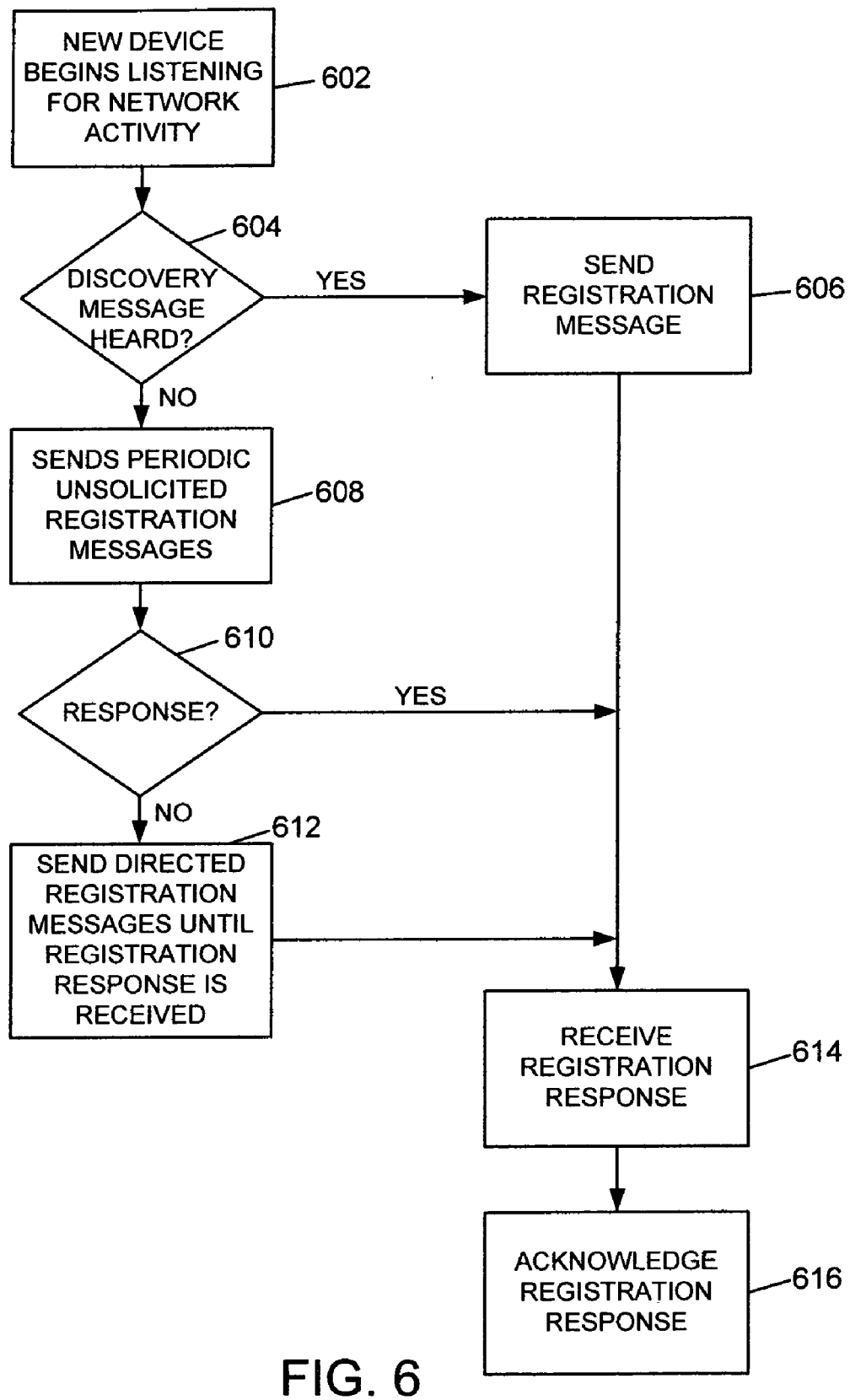
FIG. 6 is a flowchart describing steps of operation for operating a node that is joining a wireless network according to one embodiment of the present invention.

FIG. 6 is a flowchart describing steps of operating a new node desiring to discover and register to network 300. At step 602, the new device begins listening for network activity. Step 604 tests whether a discovery message has been heard during a time span sufficient for a discovery message to be expected if an active network is present. If a discovery message has been heard, the new node sends a registration message in response at step 606 during an allotted time in the discovery period. The registration message includes a MAC layer address of the new node. If no discovery message has been heard, then at step 608, the new node begins sending periodic unsolicited registration messages during the discovery period.

Step 610 determines whether a response has been heard to any of the unsolicited registration messages within a predetermined time period. If no response has been heard, then the new node sends directed registration messages. The registration messages are addressed to particular MAC layer addresses that have been overheard in the course of monitoring network activity. This is a last resort. The directed registration messages are not synchronized to the discovery period and it is anticipated that these directed registration messages will often collide with other network traffic but will eventually coincide with a quiet time. It will be appreciated that there are many possible variations in repetition period and number of repetitions for directed registration message transmissions.

Following either step 606 or 612, or detection of a registration response at step 610, a registration response is received and processed at step 614. The registration response is received either directly or indirectly from master node 302. At step 616, the new node acknowledges the registration response. This is the acknowledgement received by master node 302 at step 508.

Figure 7:
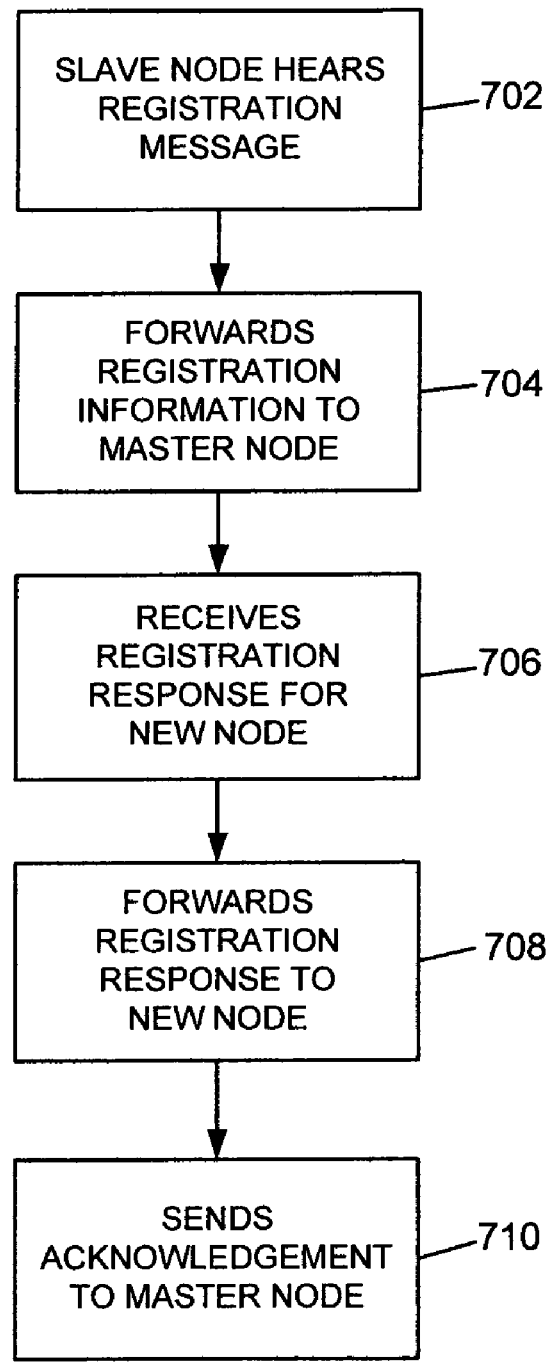
FIG. 7 is a flowchart describing steps of operating a submaster node that is responsible for interfacing to a newly admitted slave node according to one embodiment of the present invention.

FIG. 7 is a flowchart describing steps of operation of a slave node that is able to directly to contact the new node when the master node cannot. At step 702, the slave hears the registration message of the new node. At step 704, the slave node forwards the registration information to master node 302 either directly or via other intermediate nodes. The slave node may either simply relay the registration message or inserting the registration information in another message. At step 706, this slave node receives a registration response for the new node from master node 302. At step 708, this registration response is forwarded to the new node. Acknowledgment from the new node is received and then this acknowledgment is sent to master node 302 at step 710. The discovery period of FIG. 4 may include time slots for the various transmissions of the slave node in FIG. 7. When the next schedule is broadcast by the master node, the slave node, now acting as a submaster, forwards a time allocation assignment to the new node.

The above-described scheme for admitting new nodes allows for automatic reconfiguration of the network without user input. The reconfigured network continues to operate so as to avoid collisions, even between nodes that cannot hear one another.

It is understood that the examples and embodiments described herein are for illustrative purposes only and that various modifications or changes in light thereof will be suggested to persons skilled in the art and are to be included in the spirit and purview of this application and scope of the appended claims and their full scope of equivalents.

The invention claimed is:

1. In a wireless communications network, a method for coordinating access to a shared transmission medium, said wireless communications network comprising a master node, a plurality of slave nodes, and at least one submaster node, each of said slave nodes and said submaster node controlled by said master node, wherein at least one of said plurality of slave nodes is able to communicate directly with said master node, said method comprising:

upon admission of a new slave node able to communicate directly with said submaster node and out of range of said master node, recording at said master node a contact path from said master node to said new slave node, wherein said contact path includes said submaster node;

at said master node, generating a schedule of wireless transmission for nodes of said wireless communication network, said schedule precluding collisions between simultaneous transmission by any pair of nodes controlled by said master node including pairs of nodes that do not hear each other's transmissions; and distributing said schedule from said master node to nodes controlled by said master node;

wherein said schedule generated at said master node includes a transmission schedule for at least two levels of hierarchy comprising said submaster node, said plurality of slave nodes, and said new slave node, said transmission schedule configured such that only one only one of said hierarchy is permitted to transmit at a time.

2. The method of claim 1 wherein said schedule comprises time slots allocated to nodes that can be directly contacted by said master node, at least one of said time slots includes a subslot allocated for transmission by a node that cannot be directly contacted by said master node.

3. The method of claim 1 wherein recording said contact path comprises registering a link usable to communicate to said new node to a routing client.

4. The method of claim 1 wherein said schedule comprises time slots allocated to said plurality of slave nodes that can be directly contacted by said master node, said time slots being expandable, wherein generating said schedule comprises determining when to expand a first time slot associated with said nodes that can be directly contacted by said master node to accommodate said new node and expanding said first time slot when it is determined that said first time slot is to be expanded.

5. The method of claim 1 wherein said schedule is for transmission over a single channel.

6. The method of claim 1 wherein said transmission schedule for said new slave node is included within said transmission schedule for said submaster node.

7. In a wireless communication network, a method for coordinating access to a shared transmission medium, said wireless communications network comprising a master node, a plurality of slave nodes, and at least one submaster node, each of said slave nodes and said submaster node controlled by said master node, wherein at least one of said plurality of slave nodes is able to communicate directly with said master node, said method comprising:

at said submaster node, receiving registration information from a newly contactable slave node, said newly contactable slave node in direct communication with said submaster node and out of range of said master node;

forwarding said registration information from said submaster node to said master node;

at said submaster node, receiving from said master node a registration response;

at said submaster node, receiving from said master node a time allocation for transmission by said newly contactable slave node; and transmitting said time allocation for transmission by said newly contactable node to said newly contactable slave node;

wherein said newly contactable slave node, said plurality of slave nodes, said submaster node, and said master node define three levels of a transmission control hierarchy and said time allocation is scheduled such that only a single node in said transmission control hierarchy is allowed to transmit at a time.

8. The method of claim 7 further comprising:
at said submaster node, receiving a data transmission during a timeslot defined by said time allocation; and
forwarding said data transmission to said master node.

9. The method of claim 7 wherein said registration information includes a MAC layer address of said newly contactable node and said registration response includes an IP address.

10. In a wireless communication network, a method for coordinating access to a shared transmission medium, said wireless communications network comprising a master node, a plurality of slave nodes, and at least one submaster node, wherein at least one of said slave nodes is able to communicate directly with said submaster node and is out of range of said master node, said method comprising:
generating a transmission schedule at said master node; and
distributing said transmission schedule from said master node to other nodes of said wireless communication network;
wherein said transmission schedule generated at said master node is divided into a plurality of time slots, each of said plurality of slave nodes within communication range of said master node having at least one of said plurality of time slots allocated thereto for transmission from said slave node to said master node, at least one of said plurality of time slots being allocated for said submaster node and said slave node that is out of range of the master node and able to communicate directly with said submaster node;
wherein said schedule generated at said master node includes a transmission schedule for at least two levels of hierarchy comprising said submaster node and said plurality of slave nodes, said transmission schedule configured such that only one node of said hierarchy is permitted to transmit at a time.

11. Apparatus for operating a master node of a wireless communication network comprising a plurality of slave nodes and at least one submaster node in direct communication with said master node, each of said slave nodes and said submaster node controlled by said master node, said apparatus comprising:
a wireless interface that communicates information via a wireless transmission medium and that receives a transmission originating with a new slave node of said wireless communication network; and
a processor that:
records a contact path from said master node to said new node, said contact path including said submaster node;
generates a schedule of transmission via a shared transmission medium by nodes of said wireless communication network, said schedule precluding simultaneous transmission by any pair of nodes controlled by said master node including pairs of nodes that do not hear each other's transmissions; and
distributes said schedule to other nodes of said wireless communication network;
wherein said schedule includes a transmission schedule for at least two levels of hierarchy comprising said submaster node, said plurality of slave nodes, and said new node, said transmission schedule configured such that only one node of said hierarchy is permitted to transmit at a time.

12. The apparatus of claim 11 wherein said schedule comprises time slots allocated to nodes that can be directly contacted by said master node and at least one of said time slots includes a subslot allocated for transmission by a node that cannot be directly contacted by said master node.

13. The apparatus of claim 11 wherein said processor registers a link usable to communicate to said new node to a routing client.

14. In a wireless communication network, apparatus for operating a selected node of a wireless communication network, said wireless communication network comprising a master node, a plurality of slave nodes, and at least one submaster node, each of said slave nodes and said submaster node controlled by said master node, said apparatus comprising:
a wireless interface that communicates information via a wireless transmission medium and that receives a transmission from a new node of said wireless communication network, said new node of said wireless communication network in direct communication with said submaster node and out of range of said master node, said transmission comprising registration information for said new node; and
a processor at said submaster node that:
forwards said registration information to said master node;
receives from said master node a registration response;
receives from said master node a time allocation for transmission by said new node; and
transmits to said new node said time allocation for transmission by said new node;
wherein said new node, said plurality of slave nodes, and said master node define three levels of a transmission control hierarchy and said time allocation is scheduled such that only a single node in said transmission control hierarchy is allowed to transmit at a time.

15. The apparatus of claim 14 wherein said processor:
receives a data transmission during a time slot defined by said time allocation; and
forwards said data transmission to said master node.

16. The apparatus of claim 12 wherein said schedule is for transmission over a single channel.

17. In a wireless communication network, said wireless communications network comprising a master node, a plurality of slave nodes, and at least one submaster node, wherein at least one of said slave nodes is able to communicate directly with said submaster node and is out of range of said master node, apparatus for operating a master node of said communication network, said apparatus comprising:
a wireless interface that transmits and receives via a wireless transmission medium; and
a processor that:
generates a transmission schedule for nodes of said communication network; and
distributes said transmission schedule from said master node to other nodes of said wireless communication network;
wherein said transmission schedule generated at said master node is divided into a plurality of time slots, each of said plurality of slave nodes within communication range of said master node having at least one of said plurality of time slots allocated thereto for transmission from said slave node to said master node, at least one of said plurality of time slots being allocated for said submaster node and said slave node that is out of range of the master node and able to communicate directly with said submaster node;
wherein said schedule includes a transmission schedule for at least two levels of hierarchy comprising said submaster node and said plurality of slave nodes, said transmission schedule configured such that only one node of said hierarchy is permitted to transmit at a time.

18. In a wireless communication network, a computer program product for coordinating access to a shared transmission medium, said wireless communications network comprising a master node, a plurality of slave nodes, and at least one submaster node, each of said slave nodes and said submaster node controlled by said master node, wherein at least one of said plurality of slave nodes is able to communicate with said master node, said product comprising:
   code that, upon admission of a new slave node in direct communication with said submaster node and out of range of said master node, to said wireless communication network, records at said master node a contact path from said master node to said new slave node, wherein said contact path includes said submaster node;
   code that, at said master node, generates a schedule of wireless transmission for nodes of said wireless communication network, said schedule precluding simultaneous transmission by any pair of nodes controlled by said master node including pairs of nodes that do not hear each other's transmissions;
   code that distributes said schedule from said master node to nodes controlled by said master node; and
   a computer readable storage medium that stores the codes;
   wherein said schedule generated at said master node includes a transmission schedule for at least two levels of hierarchy comprising said submaster node, said plurality of slave nodes, and said new slave node, said transmission schedule configured such that only one node of said hierarchy is permitted to transmit at a time.

19. The product of claim 18 wherein said schedule comprises time slots allocated to nodes that can be directly contacted by said master node and at least one of said slots includes a subslot allocated for transmission by a node that cannot be directly contacted by said master node.

20. The product of claim 18 wherein said code that records said contact path comprises code that registers a link usable to communicate to said new node to a routing client.

21. The computer program product of claim 18 wherein said schedule comprises time slots allocated to nodes that can be directly contacted by said master node and at least one of said time slots comprises a subslot allocated for transmission by one of said slave nodes that cannot be directly contacted by said master node.

22. In a wireless communication network, a computer program product for coordinating access to a shared transmission medium, said wireless communications network comprising a master node, a plurality of slave nodes, and at least one submaster node in direct communication with said master node and one of said plurality of slave nodes that is out of range of said master node, said product comprising:
   code that generates a transmission schedule at a master node;
   code that distributes said transmission schedule from said master node to said plurality of slave nodes; and
   a computer-readable storage medium for storing the codes;
   wherein said transmission schedule generated at said master node is divided into a plurality of time slots, each of said plurality of slave nodes within communication range of said master node having at least one of said plurality of time slots allocated thereto for transmission from said slave node to said master node, at least one of said plurality of time slots being allocated for said submaster node and said slave node that is out of range of the master node and able to communicate directly with said submaster node;
   wherein said schedule includes a transmission schedule for at least two levels of hierarchy comprising said submaster node and said plurality of slave nodes, said transmission schedule configured such that only one node of said hierarchy is permitted to transmit at a time.

23. In a wireless communications network, apparatus for coordinating access to a shared transmission medium, said wireless communications network comprising a master node, a plurality of slave nodes, and at least one submaster node, each of said slave nodes and said submaster node controlled by said master node, wherein at least one of said plurality of slave nodes is in direct communication with said master node, said apparatus comprising:
   means for recording at said master node a contact path from said master node to a new slave node, wherein said contact path includes said submaster node;
   means for, at said master node, generating a schedule of wireless transmission for nodes of said wireless communication network, said schedule precluding simultaneous transmission by any pair of nodes controlled by said master node including pairs of nodes that do not hear each other's transmissions; and
   means for distributing said schedule from said master node to nodes controlled by said master node;
   wherein said schedule generated at said master node includes a transmission schedule for at least two levels of hierarchy comprising said submaster node, said plurality of slave nodes, and said new slave node, said transmission schedule configured such that only one node of said hierarchy is permitted to transmit at a time.

* * * * *